United States Patent [19]
Enneking et al.

[11] Patent Number: 5,522,116
[45] Date of Patent: Jun. 4, 1996

[54] CASKET HANDLING APPARATUS

[75] Inventors: John R. Enneking; Charles E. Kaiser, both of Batesville, Ind.

[73] Assignee: Batesville Casket Company, Inc., Batesville, Ind.

[21] Appl. No.: 276,176

[22] Filed: Jul. 15, 1994

[51] Int. Cl.$^6$ ............................ A61G 17/00; A47J 45/10
[52] U.S. Cl. ............................ 16/114 R; 27/27; 294/15
[58] Field of Search ............................ 27/27; 294/168, 294/15, DIG. 19; 16/114 R

[56] References Cited

U.S. PATENT DOCUMENTS

| | | | |
|---|---|---|---|
| 235,376 | 12/1880 | Orr | 27/27 X |
| 615,355 | 12/1898 | Green | 16/114 R |
| 687,889 | 12/1901 | Kulp | 16/114 R |
| 737,580 | 9/1903 | Carpenter | 27/27 |
| 937,086 | 10/1909 | Montross | 27/27 |
| 1,319,324 | 10/1919 | Clement | 16/114 R |
| 1,448,999 | 3/1923 | Haarberg | 16/114 R |
| 1,794,471 | 3/1931 | Moore | 16/114 R |
| 2,198,997 | 4/1940 | Hickey | 27/27 |
| 2,802,253 | 8/1957 | Birck | 27/27 |
| 4,200,323 | 4/1980 | Cocksedge | 16/114 R |

FOREIGN PATENT DOCUMENTS 395298  5/1924  Germany ........................ 27/27

*Primary Examiner*—W. Donald Bray
*Attorney, Agent, or Firm*—Wood, Herron & Evans

[57] ABSTRACT

Handling apparatus for a casket has a first member for applying a laterally inwardly directed force to a wall of the casket, a second member for applying laterally outwardly and upwardly directed forces to a lower edge of the casket, a third member interconnecting the first and second members, and a handle connected to one of the first, second and third members. When the handling apparatus is placed in contact with the casket lower edge and wall and the handle lifted upwardly a couple is applied to the apparatus and hence the casket thus retaining the apparatus in contact with the casket and enabling the casket to be lifted and transported with the apparatus. The apparatus is quickly removed by simply removing upward force from the handle. Alternatively, a clamp in the form of the threaded bolt can be included in the apparatus for clamping the casket edge between the second member and the bolt for semi-permanent installation of the apparatus on the casket.

13 Claims, 2 Drawing Sheets

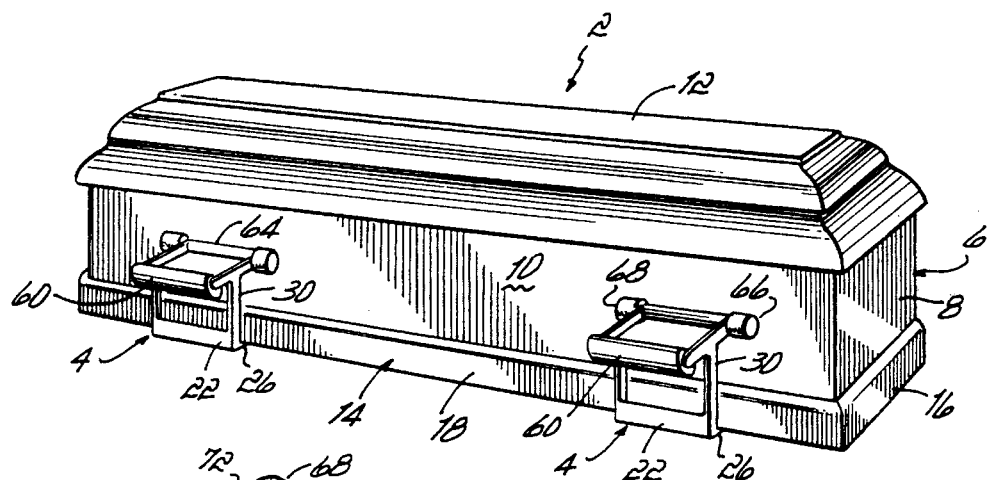
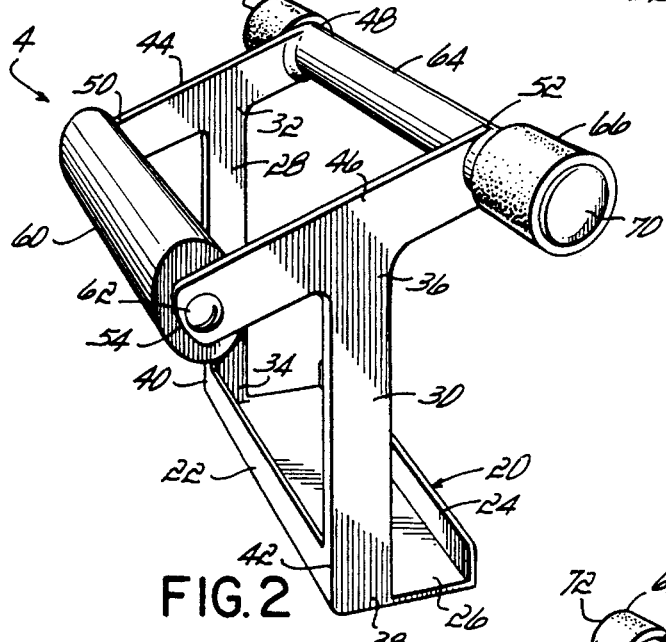
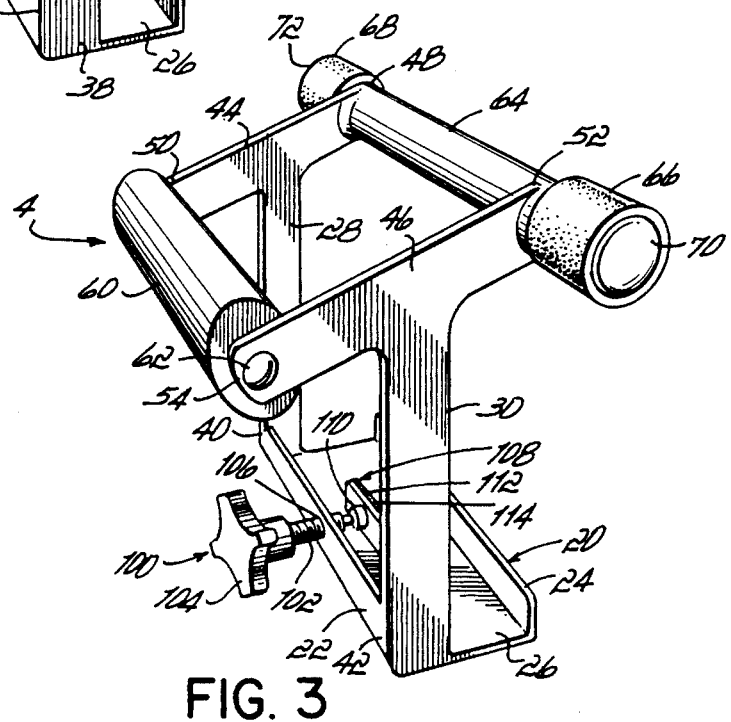

CASKET HANDLING APPARATUS

FIELD OF THE INVENTION

This invention relates generally to caskets, and more particularly to handling apparatus for a casket which is removably securable to the casket without requiring fasteners which pierce the casket.

BACKGROUND OF THE INVENTION

Caskets normally employ a plurality of handles or handlebars located around the exterior periphery of the casket for handling of the casket. These handles or handlebars are secured to the casket through the use of fastening hardware, for example escutcheon plates and nuts and bolts. Typically, holes pierce the body of the casket, and the escutcheon plates to which the handlebars are attached are secured to the casket by passing bolts through holes in the escutcheon plates and through holes in the casket wall and securing those bolts on the interior of the casket with nuts.

Caskets which are to be used in the cremation process must normally have all the metal trim, for example the handlebars, escutcheon plates and associated fasteners and the like removed before encountering the cremation process. Removal of such hardware is tedious and time consuming. If the hardware is not included on the casket in the first instance, such that the hardware is not required to be subsequently removed, difficulties are encountered in handling and transporting the casket.

SUMMARY OF THE INVENTION

An objective of the present invention has been to devise handling apparatus for a casket which is removably securable to the casket yet without requiring the use of fasteners, which pierce the casket, to secure the handling apparatus to the casket.

The present invention attains the stated objective by providing handling apparatus for a casket comprising a first member for applying a laterally inwardly directed force to a wall of the casket, a second member for applying laterally outwardly and upwardly directed forces to a lower edge of the casket, a third member interconnecting the first second members and a handle connected to one of the first, second and third members. When the handling apparatus is placed in contact with the casket lower edge and wall and the handle is lifted upwardly a couple is applied to the apparatus and hence to the casket thus retaining the apparatus in contact with the casket and enabling the casket to be lifted and transported with the apparatus. The handling apparatus is removed from the casket by simply removing the upward force from the handle thereby allowing the handling apparatus to separate and be pulled away from the casket.

In a preferred form, the handling apparatus of the present invention comprises an upturned channel section having upstanding side walls, a web connected between the side walls and opposed ends, a pair of upwardly extending members each of which has upper and lower ends and one of which is connected to each of the channel ends at the lower end thereof, a pair of laterally extending members each of which has inboard and outboard ends and one of which is connected to the upper end of each of the upwardly extending members intermediate the inboard and outboard ends, a handle spanning between the outboard ends of the laterally extending members, a bar spanning between the inboard ends of the laterally extending members, and an elastomeric bumper on each end of the bar. When the handling apparatus is placed in contact with a lower edge and a wall of the casket and the handle is lifted upwardly the channel web exerts an upward force on the lower edge of the casket, and inboardmost one of the channel side walls exerts a laterally outward force on the lower edge of the casket, and the bumpers exert a laterally inward force on the casket wall.

Should one wish to leave the handling apparatus of the present invention on a casket, yet provide for quick detachment therefrom, the outboardmost one of the channel side walls can include a threaded hole therein. A bolt is mateably threadably disposed in the hole. The lower edge of the casket may be captured between the bolt and the inboardmost one of the channel section sides by simply threading the bolt through the hole to contact the lower edge of the casket. The bolt preferably includes a knob on an outboard end thereof for ease of actuation. The bolt also preferably includes a clamping plate mounted on an inboard end thereof via a ball and socket joint. The clamping plate is thereby able to contact the casket wall across the entire surface area of the face of the clamping plate. Preferably, the clamping plate face is covered with elastomeric material.

One advantage of the present invention is that handling apparatus for a casket is provided which does not require the use of fasteners, which pierce the casket, to removably secure the apparatus to the casket.

Another advantage of the present invention is that handling apparatus for a casket is provided which is removably securable to the casket and which allows for convenient manipulation and maneuvering of the casket yet which is rapidly detachable therefrom prior to the cremation process.

These and other objects and advantages of the present invention will become more readily apparent during the following detailed description taken in conjunction with the drawings herein in which:

BRIEF DESCRIPTION OF THE DRAWINGS

FIG. 1 is a perspective view of a casket including the casket handling apparatus of the present invention;

FIG. 2 is perspective view of one form of the casket handling apparatus of the present invention;

FIG. 3 is another form of the casket handling apparatus of the present invention.

DETAILED DESCRIPTION OF THE INVENTION

Figure 4:
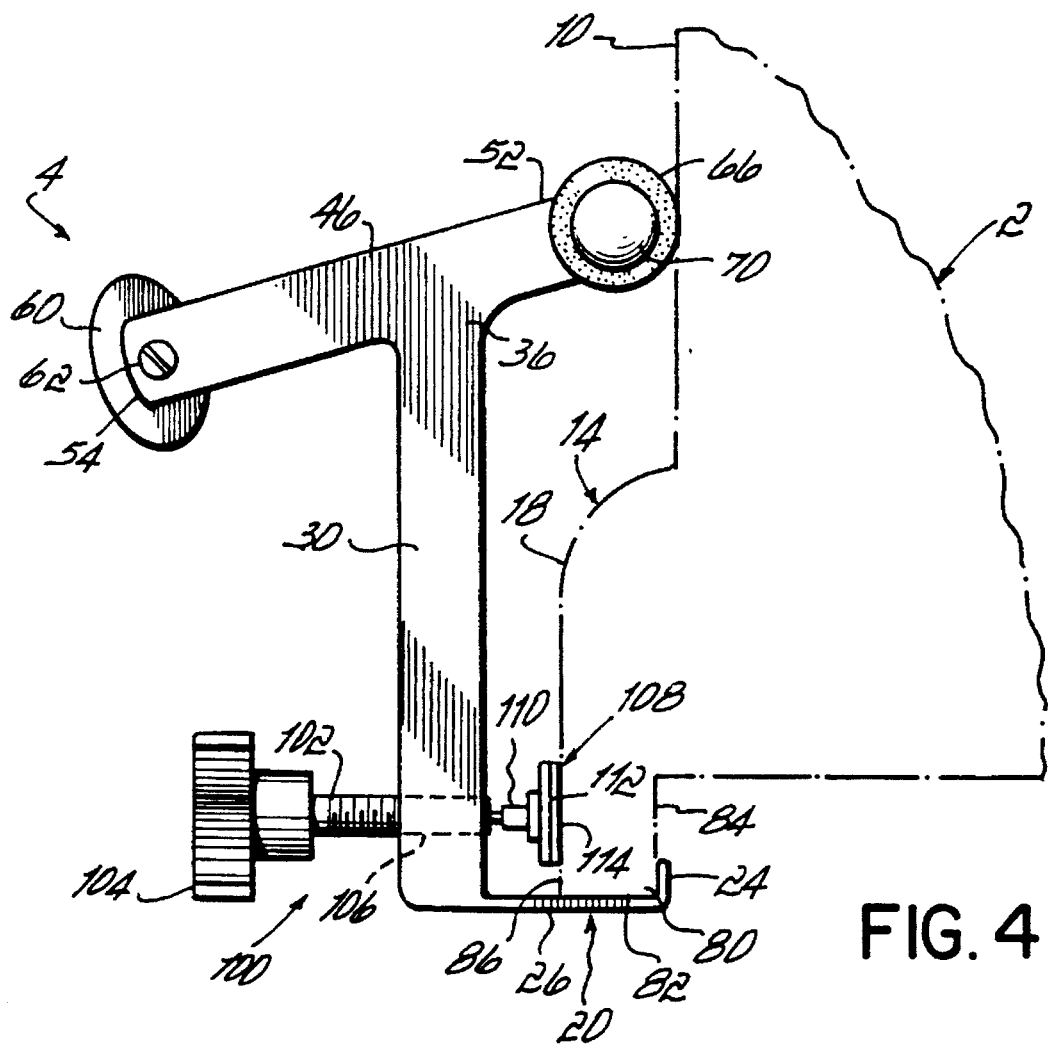
FIG. 4 is an end view of the casket of Fig. 1 illustrating in more detail the attachment of the casket handling apparatus of the present invention to a casket.

Referring first to FIG. 1, there is illustrated a casket 2 in combination with the handling apparatus 4 of the present invention. The casket 2 comprises, generally, a main body 6 including a pair of endwalls, one of which is shown at 8, a pair of side walls, one of which is shown at 10, a cap 12, and base molding 14 including end base molding 16 and side base molding 18.

Referring now to FIGS. 2, 3 and 4, a preferred form of the handling apparatus 4, which is fabricated of mild steel, of the present invention includes an upturned channel section 20 having a pair of upwardly extending side walls 22 and 24 and a web 26 connected between the side walls 22 and 24. A pair of upwardly extending members 28 and 30 which have upper and lower ends 32, 34 and 36, 38, respectively are connected as by welding to opposed ends 40 and 42 of the channel section 20. A pair of laterally extending members 44 and 46 have inboard and outboard ends 48, 50 and 52, 54, respectively. Laterally extending member 44 is connected to or is otherwise integral with the upper end 32 of upwardly extending member 28 intermediate the ends 48 and 50. Similarly, laterally extending member 46 is connected to or is otherwise integral with the upper end 36 of upwardly extending member 38 intermediate the ends 52, 54. A wooden handle 60 spans between the outboard ends 50 and 54 of the members 44 and 46, respectively and is secured there by screws, one of which is shown at 62. A bar 64 spans between the inboard ends 48 and 52 of the members 44 and 46, respectively and is secured thereto as by welding. Elastomeric, e.g. rubber, bumpers 66, 68 take the form of rubber sleeves which are slid over the ends 70 and 72 of the bar 64.

Referring to FIG. 4, it will be seen that base mold 18 includes a lower edge 80 having a horizontal surface 82 and an inboard vertical surface 84. In use, handling apparatus 4 is brought into contact with the casket 2 by placing the web 26 in contact with the surface 82 and the inboardmost side wall 24 in contact with the surface 84. The bumpers 66 and 68 contact the wall 10 and prevent marring or damage thereto. An upward force applied by user to the handle 60 causes the web 26 to exert an upward force on the edge 82 of the casket, the inboardmost channel side wall 24 to exert a laterally outward force on the surface 84, and the bumpers 66 and 68 to exert a laterally inward force on the casket wall 10. Thus, a couple is applied to the apparatus 4 and hence to the casket 2 thus retaining the apparatus 4 in contact with the casket 2 and enabling the casket 2 to be lifted and transported by the apparatus 4. To quickly remove the apparatus 4 from the casket 2, one need merely remove the upward force applied to the handle, at which time the apparatus 4 conveniently drops away from the casket 2.

Should one wish to have the handling apparatus 4 remain in contact with or otherwise installed on the casket 2 for an extended length of time, a retaining device 100 as shown in FIGS. 3 and 4 may be utilized. Retaining device 100 includes a threaded bolt 102 which includes a knob 104 on an outboard end thereof which is threadably inserted within a threaded hole 106 in the side wall 22 of channel section 20. On the inboard end of the bolt is a clamping plate 108. Clamping plate 108 is connected to the inboard end of the bolt 102 via a ball and socket joint 110 thereby enabling the clamping plate 108 to be able to contact the casket wall 10 across the entire surface area of the face 112 of the clamping plate 108 or otherwise to allow for self-alignment of the planes of the plate face 112 and wall 10. The face 112 of the plate 108 is preferably covered with elastomeric, e.g. rubber, material 114 to avoid marring or otherwise damaging the vertical surface 86 of the base molding 18.

In use of this form of the present invention, the handling device 4 is brought into contact with the casket 2 as before. Then the knob 104 is rotated to advance the bolt 102 through the hole 106 and against the outboard vertical surface 86 of the base molding 18 to capture or clamp the base molding 18 between the side wall 24 and the clamping plate 108. As opposed to the prior form of the present invention, when upward force is removed from the handle 60, the apparatus 4 remains in contact with or otherwise installed on the casket 2. Yet, the apparatus 4 is quickly removable by simply twisting the knob 104 to bring the clamping plate 108 out of engagement with the surface 86 of the base molding 18 at which time the apparatus 4 is lowerable out of contact with the casket 2.

Those skilled in the art will readily recognize numerous adaptations and modifications which can be made to the present invention which will result in an improved casket handling apparatus, yet all of which will fall within the spirit and scope of the present invention as defined in the following claims. Accordingly, the invention is to be limited only by the scope of the following claims and their equivalents.

What is claimed is:

1. Handling apparatus for a casket comprising:
    a first member for applying an inwardly directed force to a wall of the casket;
    a second member for applying outwardly and upwardly directed forces to a lower edge of the casket, said second member having a length providing line contact in a horizontal direction of said second member with the casket lower edge;
    a third member interconnecting said first and second members; and
    a handle connected to one of said first, second and third members;
    whereby when said handling apparatus is placed in contact with the casket lower edge and wall and said handle is lifted upwardly a couple is applied to said apparatus and hence the casket thus retaining said apparatus in contact with the casket and enabling the casket to be lifted and transported with said apparatus, the length of said second member providing rotational stability of said apparatus about a vertical axis when engaged with the casket.

2. The handling apparatus of claim 1 wherein said handle is connected to said third member outboard of said first and second members.

3. The handling apparatus of claim 2 wherein said handle is connected to said third member vertically intermediate said first and second members.

4. Handling apparatus for a casket which is removably securable to the casket without requiring fasteners which pierce the casket comprising:
    a laterally extending upward force applying member;
    an upwardly extending lateral force applying member connected to said laterally extending upward force applying member, said upwardly extending lateral force applying member having a length providing line contact in a horizontal direction of said member with a lower edge of the casket;
    a laterally extending lateral force applying member connected to said laterally extending upward force applying member; and
    a handle operably connected to said laterally extending upward force and lateral force applying members such that after said laterally extending upward force applying member and said upwardly extending lateral force applying member are placed in contact with the lower edge of the casket and said laterally extending lateral force applying member is placed in contact with a wall of the casket, and said handle is raised upwardly, said members apply their respective forces to the casket thus retaining said apparatus in contact with the casket and enabling the casket to be lifted with said apparatus, the length of said second member providing rotational stability of said apparatus about a vertical axis when engaged with the casket.

5. The handling apparatus of claim 4 wherein said handle is positioned laterally outboard of said force applying members.

6. Handling apparatus for a casket which is removably securable to the casket without requiring fasteners which pierce the casket comprising:

a laterally extending upward force applying member:

an upwardly extending lateral force applying member connected to said laterally extending upward force applying member;

a laterally extending lateral force applying member connected to said laterally extending upward force applying member; and a handle operably connected to said laterally extending upward force and lateral force applying members such that after said laterally extending upward force applying member and said upwardly extending lateral force applying member are placed in contact with a lower edge of the casket and said laterally extending lateral force applying member is placed in contact with a wall of the casket, and said handle is raised upwardly, said members apply their respective forces to the casket thus retaining said apparatus in contact with the casket and enabling the casket to be lifted with said apparatus;

further including a threaded bolt which is received in a matingly threaded hole in a portion of said apparatus, said bolt being operable to clamp the lower casket edge between an inboard end thereof and said upwardly extending lateral force applying member.

7. Handling apparatus for a casket which is removably securable to the casket without requiring fasteners which pierce the casket comprising:

an upturned channel section having upstanding side walls, a web connected between said side walls and opposed ends;

a pair of upwardly extending members each of which has upper and lower ends and one of which is connected to each of said channel ends at said lower end thereof;

a pair of laterally extending members each of which has inboard and outboard ends and one of which is connected to said upper end of each of said upwardly extending members intermediate said inboard and outboard ends;

a handle spanning between said outboard ends of said laterally extending members;

a bar spanning between said inboard ends of said laterally extending members; and an elastomeric bumper on each end of said bar;

whereby when said handling apparatus is placed in contact with a lower edge and a wall of the casket and said handle is lifted upwardly a couple is applied to said apparatus and hence the casket to retain said apparatus in contact with the casket and enabling the casket to be lifted and transported with said apparatus, said channel web exerting an upward force on the lower edge of the casket, an inboardmost one of said channel side walls exerting a laterally outward force on the lower edge of the casket, and said bumpers exerting a laterally inward force on the casket wall.

8. The handling apparatus of claim 7 wherein an outboardmost one of said channel side walls includes a threaded hole therein, and a bolt is mateably threadably disposed in said hole whereby the lower edge of the casket may be captured between said bolt and said inboardmost one of said channel section side walls.

9. The handling apparatus of claim 8 wherein said bolt includes a knob on an outboard end thereof for ease of actuation.

10. The handling apparatus of claim 9 wherein said bolt includes a clamping plate mounted on an inboard end thereof via a ball and socket joint, said clamping plate thereby being self-alignable and able to contact the casket wall across the entire surface area of the face of said clamping plate.

11. The handling apparatus of claim 10 wherein said face of said clamping plate is covered with elastomeric material.

12. Handling apparatus for a casket comprising:

a first member for applying an inwardly directed force to a wall of the casket, a second member for applying outwardly and upwardly directed forces to a lower edge of the casket; and a handle having a length and being operably connected to said first and second members;

said first and second members having respective lengths at least as great as the length of said handle;

whereby when said handling apparatus is placed in contact with the casket lower edge and wall and said handle is lifted upwardly a couple is applied to said apparatus and hence the casket thus retaining said apparatus in contact with the casket and enabling the casket to be lifted and transported with said apparatus, the respective lengths of said handle and first and second members providing rotational stability of said apparatus about a vertical axis when engaged with the casket.

13. The handling apparatus of claim 12 wherein said first member is longer than said handle, and said handle and second member are centered medially of the length of said first member.

* * * * *